US011957203B2

(12) United States Patent
Uzzeni

(10) Patent No.: US 11,957,203 B2
(45) Date of Patent: Apr. 16, 2024

(54) FATIGUE-REDUCING SAFETY SHOE

(71) Applicant: U-INVEST S.R.L., Paruzzaro (IT)

(72) Inventor: Pier Franco Uzzeni, Arona (IT)

(73) Assignee: U-INVEST S.R.L., Paruzzaro (IT)

( * ) Notice: Subject to any disclaimer, the term of this patent is extended or adjusted under 35 U.S.C. 154(b) by 0 days.

(21) Appl. No.: 16/611,540

(22) PCT Filed: May 11, 2018

(86) PCT No.: PCT/IB2018/053302
§ 371 (c)(1),
(2) Date: Nov. 7, 2019

(87) PCT Pub. No.: WO2018/207147
PCT Pub. Date: Nov. 15, 2018

(65) Prior Publication Data
US 2020/0107608 A1    Apr. 9, 2020

(30) Foreign Application Priority Data

May 12, 2017 (IT) .................. 102017000051624

(51) Int. Cl.
*A43B 13/12* (2006.01)
*A43B 7/00* (2006.01)
(Continued)

(52) U.S. Cl.
CPC .............. *A43B 13/127* (2013.01); *A43B 7/00* (2013.01); *A43B 7/144* (2013.01); *A43B 7/145* (2013.01);
(Continued)

(58) Field of Classification Search
CPC ..... A43B 13/12; A43B 13/127; A43B 13/189; A43B 7/142; A43B 13/18; A43B 13/02;
(Continued)

(56) References Cited

U.S. PATENT DOCUMENTS

| 2,502,774 | A | * | 4/1950 | Alianiello | .............. | A43B 21/32 36/28 |
| 3,834,046 | A | * | 9/1974 | Fowler | .................. | A43B 13/181 36/28 |

(Continued)

FOREIGN PATENT DOCUMENTS

| CA | 2571229 C | * | 11/2012 | ............... | B32B 5/22 |
| CN | 1880356 A | * | 12/2006 | .............. | C08J 9/122 |

(Continued)

OTHER PUBLICATIONS

International Search Report dated Jul. 10, 2018 in PCT/IB2018/053302 filed on May 11, 2018.

*Primary Examiner* — Khoa D Huynh
*Assistant Examiner* — Erick I Lopez
(74) *Attorney, Agent, or Firm* — Oblon, McClelland, Maier & Neustadt, L.L.P.

(57) ABSTRACT

The present invention relates to a fatigue-reducing safety shoe. The shoe according to the present invention is able to offer the user a high degree of protection in case of accidental events, in accordance with current regulations, together with a higher level of comfort perceived by the user due to a specific configuration of the multilayer sole capable of respecting the ergonomics of the user according to the biomechanics of the walk.

10 Claims, 2 Drawing Sheets

(51) Int. Cl.
  *A43B 7/144* (2022.01)
  *A43B 7/145* (2022.01)
  *A43B 7/32* (2006.01)
  *A43B 17/16* (2006.01)
(52) U.S. Cl.
  CPC ............... *A43B 7/32* (2013.01); *A43B 13/12* (2013.01); *A43B 17/16* (2013.01)
(58) Field of Classification Search
  CPC .... A43B 13/125; A43B 13/186; A43B 13/187
  USPC ....................................................... 36/25 R
  See application file for complete search history.

(56) References Cited

U.S. PATENT DOCUMENTS

| | | | | |
|---|---|---|---|---|
| 4,231,169 A * | 11/1980 | Toyama | A43B 13/04 | 12/146 S |
| 4,316,332 A * | 2/1982 | Giese | A43B 5/00 | 36/114 |
| 4,391,048 A * | 7/1983 | Lutz | A43B 1/0036 | 36/28 |
| 4,897,939 A * | 2/1990 | Harrington | B29D 35/081 | 36/108 |
| 5,311,677 A * | 5/1994 | Mann | A43B 7/142 | 36/107 |
| 5,681,649 A * | 10/1997 | Mashita | A43B 1/0036 | 36/72 R |
| 5,775,005 A * | 7/1998 | McClelland | A43B 1/0072 | 36/134 |
| 5,815,949 A * | 10/1998 | Sessa | A43B 13/16 | 36/3 B |
| 5,933,982 A * | 8/1999 | Chen | A43B 13/18 | 36/28 |
| 5,946,755 A * | 9/1999 | Aoki | B29D 35/082 | 12/142 RS |
| 5,951,935 A * | 9/1999 | Healy | B29D 35/142 | 156/247 |
| 5,985,383 A * | 11/1999 | Allen | A42B 3/121 | 36/88 |
| 6,038,790 A * | 3/2000 | Pyle | A43B 7/1425 | 36/28 |
| 6,167,639 B1 * | 1/2001 | Ventura | A43B 7/32 | 36/30 R |
| 6,446,359 B2 * | 9/2002 | Tomat | A43B 7/08 | 36/28 |
| 6,519,874 B1 * | 2/2003 | Dean | A43B 7/1415 | 36/30 R |
| 6,759,443 B2 * | 7/2004 | Brant | C08G 18/6674 | 521/51 |
| 6,878,753 B1 * | 4/2005 | Takemura | C08G 18/6648 | 521/128 |
| 7,410,684 B2 * | 8/2008 | McCormick | A43B 7/34 | 428/190 |
| 8,621,765 B2 * | 1/2014 | Geer | A43B 13/10 | 36/12 |
| 8,635,789 B2 * | 1/2014 | Spiller | A43B 23/26 | 36/72 R |
| 9,554,616 B2 * | 1/2017 | Horesh | A43B 7/141 | |
| 9,668,539 B2 * | 6/2017 | La Rochelle | A43B 7/32 | |
| 9,676,963 B2 * | 6/2017 | Rolland | C08K 3/013 | |
| 10,849,387 B2 * | 12/2020 | Bruce | A43B 7/1425 | |
| 10,934,384 B1 * | 3/2021 | Robinson | C08G 18/4238 | |
| 2003/0217483 A1 * | 11/2003 | Abraham | A43B 13/182 | 36/28 |
| 2004/0163280 A1 * | 8/2004 | Morris | A43B 7/1445 | 36/28 |
| 2004/0226918 A1 * | 11/2004 | Lee | C09K 3/1463 | 216/89 |
| 2005/0022425 A1 * | 2/2005 | Brown | A43B 13/12 | 36/30 R |
| 2005/0044751 A1 * | 3/2005 | Alaimo | A43B 13/125 | 36/181 |
| 2005/0132614 A1 * | 6/2005 | Brennan | A43B 13/12 | 36/73 |
| 2006/0211318 A1 * | 9/2006 | Fenzi | A43B 13/026 | 442/181 |
| 2006/0254088 A1 * | 11/2006 | McCormick | A41D 31/065 | 36/44 |
| 2006/0270746 A1 * | 11/2006 | Younes | C08G 18/12 | 521/131 |
| 2007/0039210 A1 * | 2/2007 | Clark | A43B 1/0036 | 36/4 |
| 2009/0145006 A1 * | 6/2009 | Hubner | A43B 23/086 | 36/73 |
| 2010/0055358 A1 * | 3/2010 | Weaver | C09D 123/02 | 428/17 |
| 2010/0124652 A1 | 5/2010 | Younes et al. | | |
| 2010/0192408 A1 * | 8/2010 | Righetto | A43B 7/144 | 36/29 |
| 2010/0287795 A1 * | 11/2010 | Van Niekerk | B29C 44/0415 | 36/25 R |
| 2013/0145521 A1 * | 6/2013 | Spicuzza | A41B 11/007 | 2/239 |
| 2013/0232824 A1 * | 9/2013 | Bier | A43B 7/06 | 36/3 A |
| 2014/0109438 A1 * | 4/2014 | Hoogerbrugge | A43B 17/18 | 36/43 |
| 2015/0128335 A1 * | 5/2015 | Dehni | C08G 18/7664 | 2/459 |
| 2015/0291723 A1 * | 10/2015 | Scussolin | C08G 18/14 | 521/126 |
| 2017/0095032 A1 * | 4/2017 | Lacroix | A43B 23/081 | |
| 2018/0132564 A1 * | 5/2018 | Bruce | A43B 13/189 | |
| 2018/0345576 A1 * | 12/2018 | Constantinou | B29C 64/176 | |
| 2018/0368516 A1 * | 12/2018 | Mason | A43B 13/04 | |
| 2019/0387836 A1 * | 12/2019 | Recchi | A43B 7/32 | |
| 2020/0163406 A1 * | 5/2020 | Chen | A43B 13/18 | |
| 2020/0170342 A1 * | 6/2020 | Uzzeni | A43B 7/144 | |
| 2020/0181352 A1 * | 6/2020 | Constantinou | C08J 9/224 | |

FOREIGN PATENT DOCUMENTS

| | | | | |
|---|---|---|---|---|
| CN | 101842528 B | * | 9/2012 | ............ D04H 1/558 |
| CN | 202697865 U | * | 1/2013 | |
| CN | 102066486 B | * | 8/2013 | ............ C08J 3/075 |
| DE | 7137548 U | | 1/1972 | |
| DE | 7030339 U | | 7/1973 | |
| DE | 88 15 539 U1 | | 2/1989 | |
| DE | 8815539 U1 | * | 2/1989 | ............ A43B 13/42 |
| EP | 1 726 612 A2 | | 11/2006 | |
| KR | 100979262 B1 | * | 9/2010 | |
| WO | WO 2007/003633 A1 | | 1/2007 | |
| WO | WO-2007003633 A1 | * | 1/2007 | ............ A43B 13/12 |
| WO | WO-2010007456 A1 | * | 1/2010 | ............ A43B 13/12 |
| WO | WO 2014/085077 A1 | | 6/2014 | |
| WO | WO 2015/035068 A1 | | 3/2015 | |
| WO | WO-2020120316 A1 | * | 6/2020 | ............ C08G 18/48 |
| WO | WO-2020161110 A1 | * | 8/2020 | ............ C08G 18/797 |

* cited by examiner

FATIGUE-REDUCING SAFETY SHOE

The present invention relates to a fatigue-reducing safety shoe.

Safety shoes, or accident prevention shoes, are known from the prior art, offering the user a high degree of protection in case of accidental events.

These shoes, in order to be defined as accident prevention, must comply with stringent regulations. Currently, these shoes must comply with the EN ISO20344 and EN IS20345 standards.

As is known, all safety shoes, in order to comply with the regulations in force on the subject, comprise an upper provided, at the shoe toe, with a safety cap sufficiently structured and therefore rigid, to resist shocks or crushing, safeguarding the user's foot.

Since they are work shoes, they are intended not only to be worn by the user for several hours a day consecutively, but also in the context of activities in which the user is constantly moving.

Hence, there is the need for the safety shoes discussed above to be able to provide the user with a satisfactory level of comfort.

For this purpose, it is known from the prior art to provide safety shoes provided with a layered sole comprising an insert made of an elastic material which makes the foot resting on the ground more comfortable when walking.

More particularly, for example, safety shoes comprising a sole provided with an elastic insert made of thermoplastic polyurethane foam are known from to prior art.

This insert provides a soft and dynamic cushioning that returns energy during walking.

While these safety shoes have found the favour of users and are very widespread today, they are not free from drawbacks.

Among the drawbacks affecting the accident prevention shoes known from the prior art, provided with a layered sole comprising an insert made of elastic material made of thermoplastic polyurethane foam, there is the fact that the return of the energy ensured by the insert affects the whole foot sole, which does not make walking comfortable.

The aim of the present invention is therefore to provide a safety shoe which solves the technical problem described above, and which overcomes the drawbacks and exceeds the limits of the prior art, thereby ensuring complete user comfort.

Within the scope of this aim, an object of the present invention is therefore to provide a safety shoe which is relaxing for the user wearing it.

A further object of the invention is to provide a fatigue-reducing safety shoe which is capable of ensuring the greatest reliability and safety in use.

Another object of the invention is to provide a safety shoe that is easy to make and economically competitive when compared to the prior art.

The above aim, as well as the above and other objects which will become apparent hereinafter, are achieved by a fatigue-reducing safety shoe, comprising an upper provided, at the toe, with a safety cap and comprising a layered sole associated with said upper, wherein said layered sole comprises a lower layer adapted to come into contact with the ground, an intermediate layer associated with said upper and said lower layer, respectively, and an upper layer, characterised in that, in said intermediate layer, an elastic insert is embedded at the rear zone of said shoe and an absorbing insert is embedded at the front zone of said shoe, said upper layer completely overlapping said elastic insert and said absorbing insert.

Further features are described in the dependent claims.

Further features and advantages will appear more clearly from the description of a preferred but non-exclusive embodiment of a fatigue-reducing safety shoe according to the present invention, shown by way of a non-limiting example with the aid of the accompanying drawings, in which.

Figure 1:
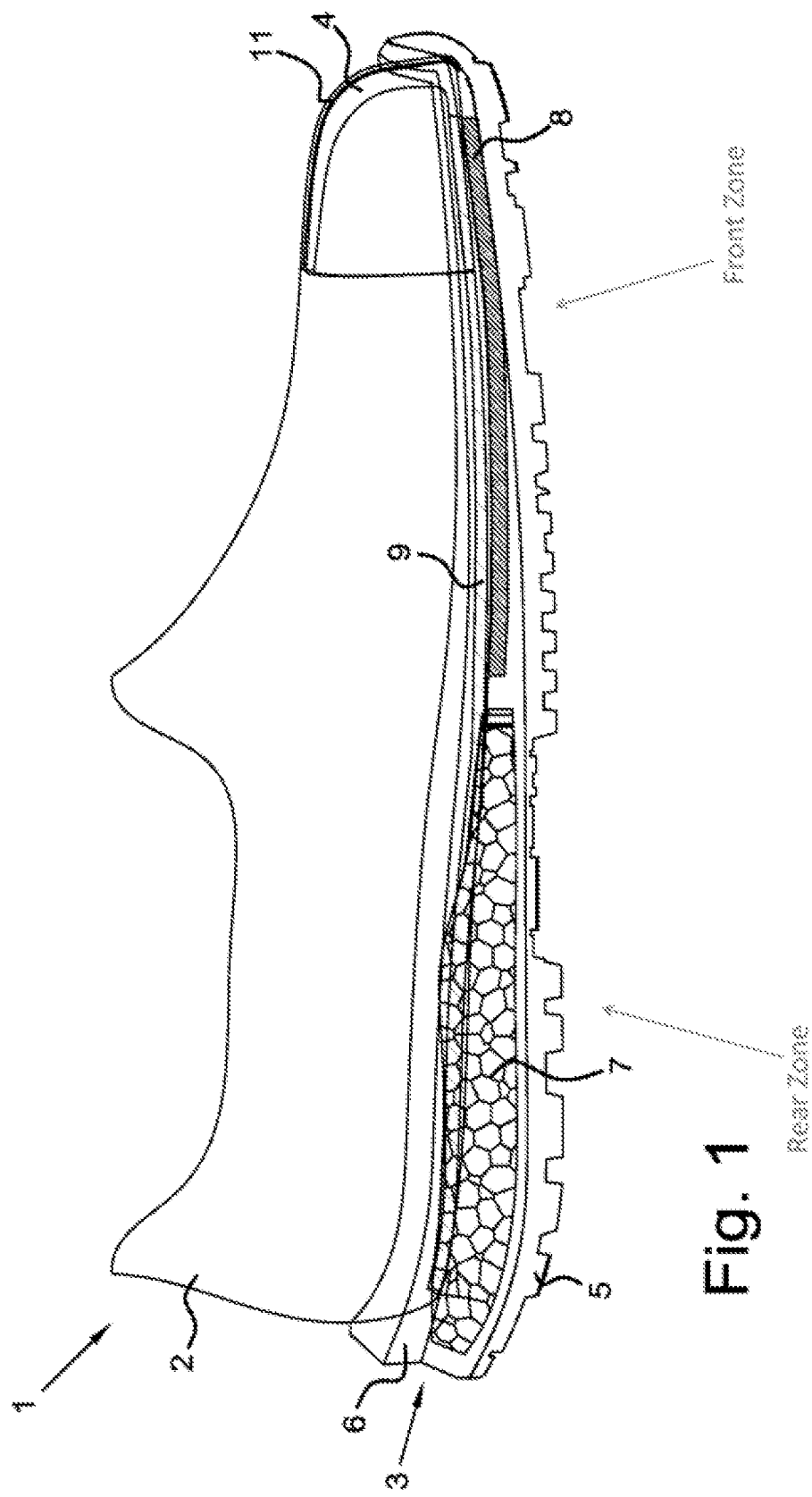
FIG. 1 is an overall side elevation view of the shoe according to the present invention.
Figure 2:
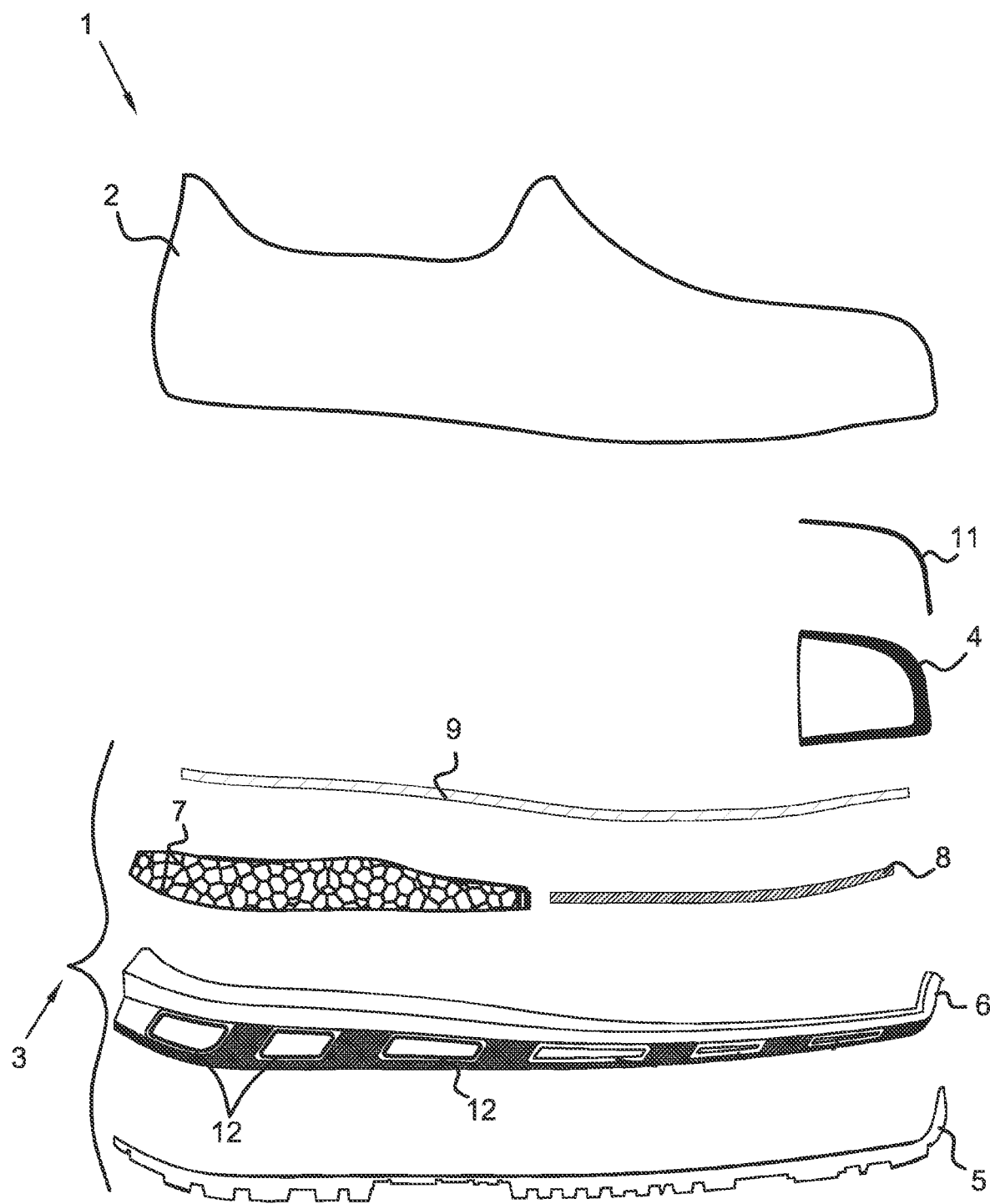
FIG. 2 is an exploded side elevation view of the fatigue-reducing safety shoe of FIG. 1.

With reference to the above figures, the safety shoe according to the present invention, indicated as a whole by reference numeral 1, comprises an upper 2 which is provided, at the toe, with a safety cap 4, and a layered sole 3 associated with said upper 2.

According to the preferred embodiment of the safety shoe, the layered sole 3 in turn comprises at least one lower layer 5 adapted to come into contact with the ground, and at least one intermediate layer 6 associated both with said upper 2 and with said lower layer 5.

According to the present invention, the fatigue-reducing safety shoe 1 further comprises, inserted in said intermediate layer 6, respectively at the rear zone of said shoe 1, an elastic insert 7 and, at the front zone of said shoe 1, an absorbing insert 8, a further upper layer 9 of said layered sole 3 completely overlapping said elastic insert 7 and said absorbing insert 8.

According to a preferred embodiment of the present invention, the elastic insert 7 is extended over a surface substantially comprised between 45% and 70% of the total surface of said layered sole 3, preferably over a surface substantially equal to 55% of the total surface of said layered sole 3.

Again according to a preferred embodiment of the present invention, the absorbing insert 8 is extended over a surface substantially comprised between 5% and 30% of the total surface of said layered sole 3, preferably over a surface substantially equal to at least 15% of the total surface of said layered sole 3.

Advantageously, said absorbing insert 8 is made of a gel-based material or of a polyurethane resin or a polyether resin, so as to be characterised by a "viscous" behaviour which ensures dampening of the energy of the walk by reducing the return effect of the elastic energy that characterises the footwear of a type known from the prior art.

The absorbing insert 8 is therefore capable of absorbing the energy of the walk, performing a fatigue-reducing function, since the user makes less effort in countering the return of elastic energy that would derive from a sole without said insert.

Preferably, said absorbing insert 8 is made of a gel-based material comprising a sol-gel, or a colloidal material in a gelatinous form.

Even more preferably, said absorbing insert 8 is made of a bicomponent polyurethane resin-based material.

Advantageously, said polyurethane resin can consist of a bicomponent polyurethane resin comprising a polyol and an isocyanate, preferably in which said polyol has a viscosity of between 1000 and 2000 MPAS (millipascal per second) and said isocyanate has a viscosity of between 400 and 600 MPAS.

The viscosity referred to above is understood herein as the sliding speed of the material in its operative housing.

Preferably, the viscosity of the polyol is around 1400 MPAS, and the viscosity of the isocyanate is around 500 MPAS.

Advantageously, the polyol has a cream temperature substantially between 30 and 35° C., and a cream time substantially between 12 and 20 seconds.

Advantageously, moreover, the isocyanate has a cream temperature substantially between 34 and 45° C. and a cream time substantially between 12 and 20 seconds.

Alternatively, the absorbing insert 8 is made of a bicomponent polyether resin-based material.

Advantageously, said polyether resin may consist of a bicomponent polyether resin comprising a polyol and an isocyanate, preferably at a polyol:isocyanate ratio substantially equal to 100:52.

Preferably, the isocyanate is a 4,4'-diphenylmethane diisocyanate.

The bicomponent polyether resin-based material in which the absorbing insert 8 is made has a density of about 310 Kg/m$^3$, a hardness of about 23 Shore A, a tensile strength of about 1.6 MPa, an elongation at break of about 220% and a resilience of about 34%, measured according to DIN 53 standards.

These physical properties ensure to the bicomponent polyether resin-based material in which the absorbing insert 8 is made, a considerable ability to absorb the energy of the walk, reducing the effect of returning the elastic energy which characterises the footwear of a type known from the prior art.

Advantageously, the elastic insert 7 is made as a block of expanded thermoplastic polyurethane. In essence, the elastic insert 7 is made of an elastic material adapted to return the energy of the walk, while the absorbing insert 8 is made of an absorbing material capable of absorbing the energy of the walk. In this way, during the walk, and in particular during the contact of the foot with the ground, the elastic insert 7 returns energy at the heel and the absorbing insert 8 absorbs energy at the tip of the foot.

The lower layer 5 is preferably made of polyurethane, nitrile or a combination of these two elements.

According to a preferred embodiment of the fatigue-reducing safety shoe according to the present invention, the upper layer 9 covering said elastic insert 7 and said absorbing insert 8 preferably comprises an anti-puncture sheet.

Advantageously, said anti-puncture sheet extends substantially along the entire length of the intermediate layer 6, so as to completely cover the foot sole of the user when worn.

Said anti-puncture sheet is preferably made of non-metallic material, for example made of a resin-based polyester material or similar material.

The intermediate layer 6 can also be made of a material of the polyurethane type.

The upper layer 9 can be defined by the same material in which the intermediate layer 6 is made. In this way, the elastic insert 7 and the absorbing insert 8 are completely embedded in the intermediate layer 6, with the exception of the portions facing the windows 12.

The fatigue-reducing safety shoe according to the present invention comprises a safety cap 4 in the front zone of the upper which meets the safety regulations in force, including EN ISO20344 and EN ISO20345.

While the minimum requirement to meet the requirements established by the regulations is the simple presence of a safety cap 4, advantageously the shoe 1 according to the present invention is provided with a safety cap 4 provided with holes configured to ensure the transpiration of the foot, according to a solution developed by the Applicant.

Preferably, moreover, a protective membrane 11 is provided to close the holes made on the cap, so as to allow at the same time the transpiration and protection of the user's foot.

According to a preferred embodiment of the shoe according to the present invention, one or more windows can be provided on the lateral surfaces of the intermediate layer 6 in order to make the elastic insert 7 and/or the absorbing insert 8 placed inside of the intermediate layer 6 itself visible, however, at the same time they also have the technical function of allowing the deformation of the material outwards, so as to support the deformation of the material as a result of compression, increasing its ability to deform by absorbing the elastic forces deriving from the weight of the user during the walk.

It has thus been shown that the fatigue-reducing safety shoe, as described above, object of the present invention, allows carrying out the aim and achieving the objects for which it was conceived.

It is understood that the embodiment described by way of example is susceptible to many modifications and variants, all falling within the invention; furthermore, all the details are replaceable by technically equivalent elements.

In particular, the materials used as well as the sizes, can be whatever, according to the technical requirements.

The invention claimed is:

1. A fatigue-reducing safety shoe, comprising:
   an upper provided, at the shoe toe, with a safety toe-cap; and
   a layered sole associated with said upper, said layered sole including a lower layer adapted to come into contact with the ground, and an intermediate layer associated with said upper and said lower layer, respectively, and an upper layer,
   wherein, an elastic insert is embedded in the intermediate layer at a rear zone of said shoe and an absorbing insert is embedded in the intermediate layer at a front zone of said shoe,
   wherein the absorbing insert is made of an absorbing material capable of absorbing the energy of the walk,
   wherein the upper layer completely overlaps the elastic insert and said absorbing insert,
   wherein the elastic insert is extended over a surface comprised between 45% and 70% of the total surface of the layered sole,
   wherein the absorbing insert is extended over a surface comprised between 5% and 30% of the total surface of the layered sole, and
   wherein one or more windows are provided on the lateral surfaces of the intermediate layer in order to make the elastic insert and/or the absorbing insert placed inside of the intermediate layer itself visible.

2. The fatigue-reducing safety shoe, according to claim 1, wherein said upper layer comprises an anti-puncture sheet which is extended so as to
   completely cover the user's foot sole.

3. The fatigue-reducing safety shoe, according to claim 1, wherein said absorbing insert is made of a gel-based or polyurethane resin-based material.

4. The fatigue-reducing safety shoe, according to claim 3, wherein said gel-based material is a sol-gel.

5. The fatigue-reducing safety shoe, according to claim 1, wherein said absorbing insert is made of a bicomponent polyurethane resin-based material.

6. The fatigue-reducing safety shoe, according to claim 5, wherein said bicomponent polyurethane resin-based material comprises a polyol and an isocyanate.

7. The fatigue-reducing safety shoe, according to claim 6, wherein said polyol has a viscosity comprised between 1000 and 2000 MPAS and said isocyanate has a viscosity comprised between 400 and 600 MPAS.

8. The fatigue-reducing safety shoe, according to claim 1, wherein said absorbing insert is made of a bicomponent polyether resin-based material.

9. The fatigue-reducing safety shoe, according to claim 8, wherein said bicomponent polyether resin-based material comprises a polyol and an isocyanate.

10. The fatigue-reducing safety shoe, according to claim 1, wherein each of the elastic insert and the absorbing insert are positioned in the intermediate layer such that a lower surface of the elastic insert and a lower surface of the absorbing insert are each in contact with an upper surface of the intermediate layer.

\* \* \* \* \*